UNITED STATES PATENT OFFICE.

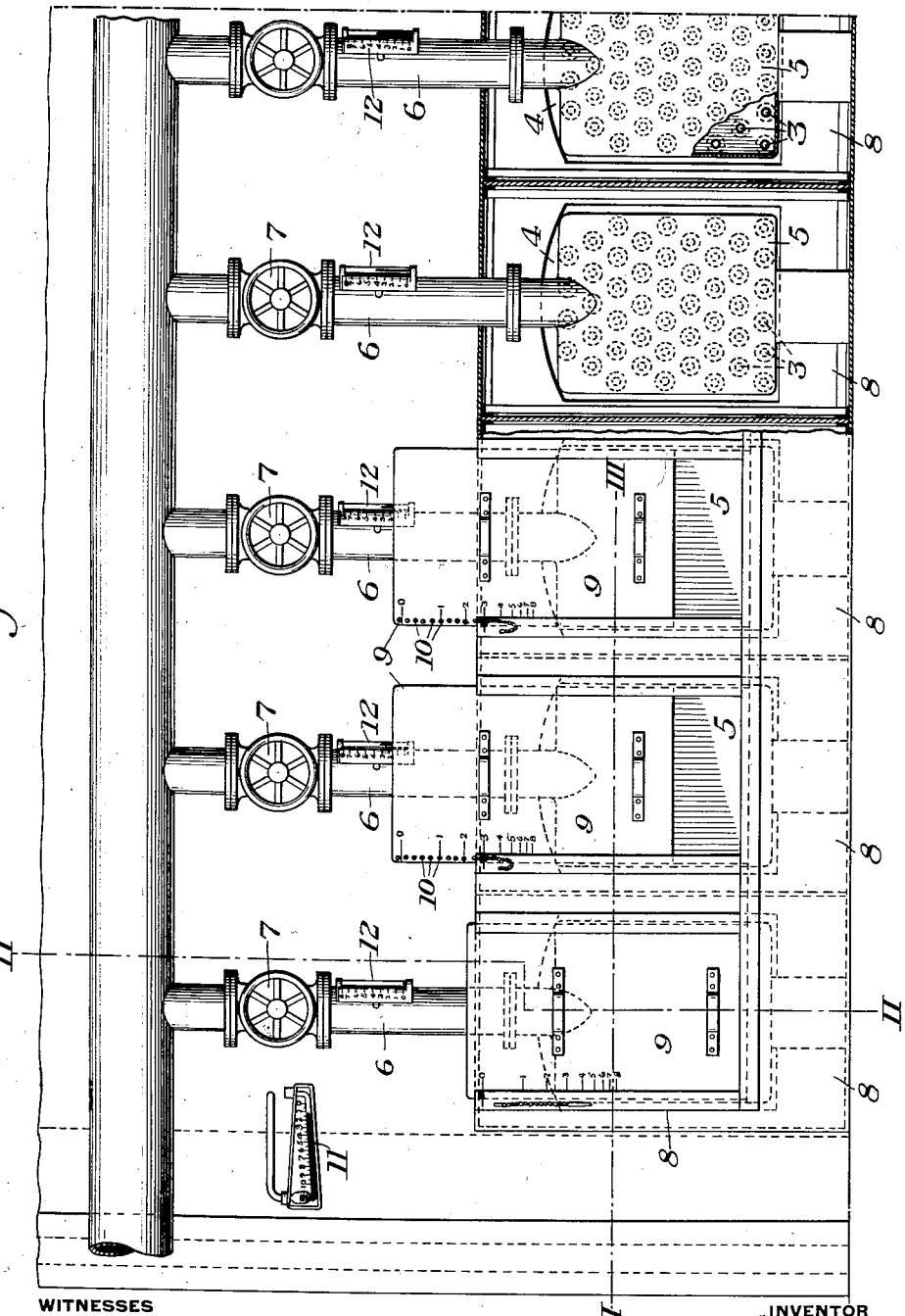

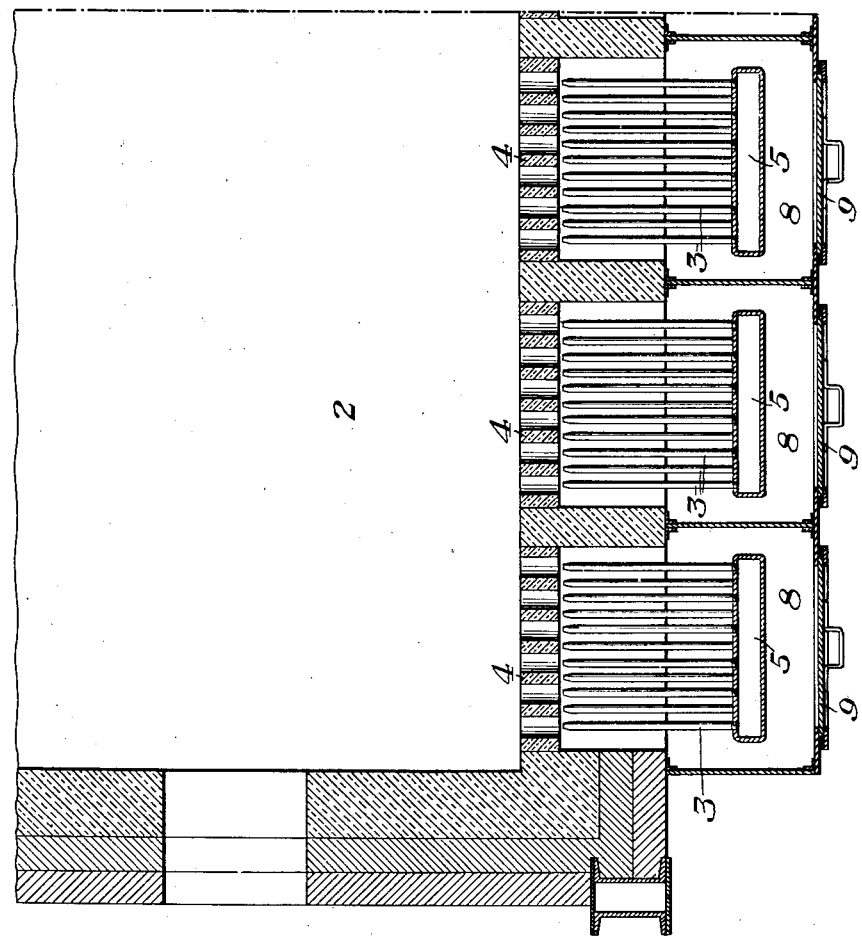
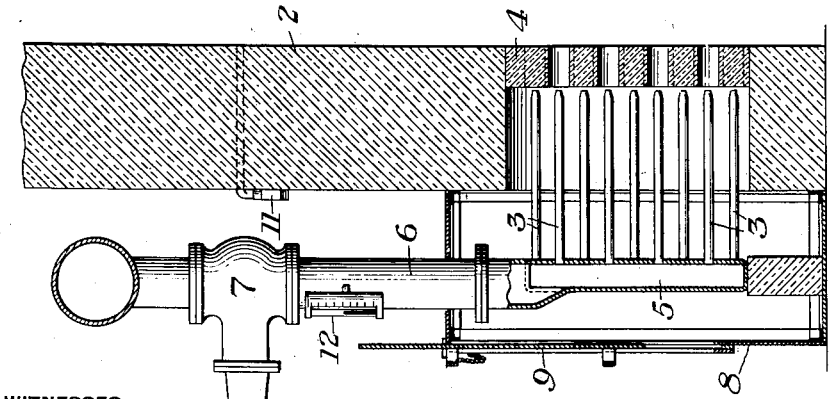

JAMES CLARENCE HOBBS, OF PITTSBURGH, PENNSYLVANIA.

FEEDING FLUID FUEL AND AIR TO COMBUSTION CHAMBERS.

1,409,111. Specification of Letters Patent. Patented Mar. 7, 1922.

Application filed September 3, 1918. Serial No. 252,314.

*To all whom it may concern:*

Be it known that I, JAMES CLARENCE HOBBS, a citizen of the United States, residing at Pittsburgh, in the county of Allegheny and State of Pennsylvania, have invented a new and useful Improvement in Feeding Fluid Fuel and Air to Combustion Chambers, of which the following is a full, clear, and exact description, reference being had to the accompanying drawings, forming part of this specification, in which—

Figure 1 is a front view of one form of apparatus built in accordance with my invention.

Figure 2 is a sectional view on the line II—II of Figure 1, and

Figure 3 is a sectional plan view on the line III—III of Figure 1.

This invention relates to an improvement in the method of feeding fluid fuel and air to combustion chambers, and is designed to provide a cheap and efficient method and apparatus whereby the proper amount of air is fed to the furnace, in proportion to the amount of fluid fuel, in order to form proper combustion. I accomplish this by automatically measuring or gauging the gas passing to the furnace and then manually setting the air inlet or inlets to afford the requisite amount of air to combine therewith.

I am aware that it is old in the art to regulate the amount of fuel and air fed to the furnaces, but in all cases known to me this is done in a hit and miss manner. By the use of my invention, I measure or gauge the amount of gas or fuel fed to the furnace by a suitable gauge device and then regulate the size of the opening of the air feed in accordance with the amount of gas passing to the furnace.

The precise nature of my invention will be best understood by reference to the accompanying drawings which will now be described, it being premised, however, that various changes may be made in the details of construction and the general arrangement of the parts, without departing from the spirit and scope of my invention as defined in the appended claims.

Referring to the accompanying drawings, the reference character 2 designates the furnace to be fired, and 3 the gas burners which are placed in front of the usual tiles 4 having openings therethrough, through which the combined air and gas pass to the furnace.

The gas burners each comprise a gas box or manifold 5, which is connected to a pipe 6, which is in turn connected to a gas main. 7 is a gas valve for controlling the amount of gas passing from the gas main to the manifold. Each manifold or gas burner is enclosed in a casing 8, which is provided with an inlet opening having a control gate 9. This control gate is provided with a series of openings 10 for the reception of a pin or pins to hold it in its adjusted position. If desired, the guide for the gate or the gate itself, may be graduated in any desired manner in order to designate the size of the air opening in the casing. A draft gauge 11, such as is usually used in connection with the flue, is here provided for the purpose of indicating the pressure within the furnace, as clearly shown in the drawings. Connected to each feed pipe of each burner between the gas valve and the manifold is a pressure gauge 12, which I have shown as of the usual U-tube type, and which is arranged to indicate the pressures of gas in the burner, or manifold thereof. The fireman in charge of the furnace ascertains the pressure of gas in each of the feed pipes and he is provided with a chart giving the exact size of the opening for the air for pressures in the gas feed pipes, so that it is only necessary for him to adjust the gate 9 in accordance with the chart to give the required opening for the pressure indicated on the gauge.

I preferably place the tables giving the sizes of the air openings for different pressures on the gates 9, as indicated diagrammatically in Figure 1.

It will be understood that the construction herein described constitutes means for measuring the amount of gas passing to the furnace, as well as the amount of air. This means as illustrated herein comprises flow meters of the orifice type. The burner tubes 3 constitute the gas orifices, all of which may be calibrated, if desired. The orifice for the air, on the other hand, is a variable one, determined by the position of the gate 9. The pressure difference across the air orifice is indicated by the gauge 11, while the pressure difference across the orifices of the burner tubes will be indicated by the gauge 12, when read in connection with the gauge 11. The differences in pressure across the respective orifices being known and the size of the orifices being known, the flow of air and gas can be accurately measured. It will also be understood that instead of calibrating the orifices of the burner tubes 3, the graduations on the gauge 12 may be determined in any well known manner, before or after installation, by comparison with any desired standard.

The advantages of my invention result from the provision of a method and apparatus for firing furnaces whereby a predetermined amount of air is fed to the furnaces together with gas or other fuel, so that a predetermined mixture of fuel and air is fed to the combustion chamber.

I claim:

1. The combination of a furnace and a fuel burner, a pipe for feeding fuel to said burner, a valve in said pipe for regulating the amount of fuel fed thereto, a casing surrounding the burner, there being an opening for feeding air to said casing, a graduated valve for controlling the size of said opening, and a fuel gauge connected to the pipe between the outlet from the burner and the valve in the pipe; substantially as described.

2. The combination of a furnace and a gas burner, a casing in which the gas burner is mounted, said burner having a plurality of gas nozzles connected to a manifold, a gas supply pipe leading to the manifold, a valve in said pipe for controlling the amount of gas fed to the manifold, a pressure gauge connected to the gas feed between the nozzles and the valve, the casing surrounding the gas burner having a graduated opening through which air is fed thereto, and an adjustable gate for varying the size of the air opening; substantially as described.

3. The combination of a furnace and a gas burner, a casing in which the gas burner is mounted, said burner having a plurality of gas nozzles connected to a manifold, a gas supply pipe leading to the manifold, a valve in said pipe for controlling the amount of gas fed to the manifold, a pressure gauge connected to the gas feed between the nozzles and the valve, the casing surrounding the gas burner having a graduated opening through which the air is fed thereto, and an adjustable gate for varying the size of the air opening, together with markings for indicating the size of said openings; substantially as described.

4. An apparatus for feeding fluid fuel and air to combustion chambers, the combination of a fluid fuel channel, means for varying the amount of fuel passing therethrough, means to enable the amount of fuel passing therethrough to be determined, an air inlet and graduated hand controlled means for varying the amount of entering air in accordance with the amount of fluid fuel being fed; substantially as described.

5. A gas burner provided with means for independently supplying air and gas to the said burner, a pressure gage for indicating the gas pressure and an indicator for regulating the air supply, the said pressure gage and the said indicator being provided with graduated scales that are similar in appearance and marking, whereby when the said air indicator scale is set at the same reading as the reading on the said pressure gage an efficient mixture of gas and air is supplied to the said burner.

6. In a gas burner, the combination of a suitable box or casing, a gas receptacle, a gas supply pipe connected therewith, gas pipes leading from said receptacle into said box, a pressure gauge for indicating the pressure in said gas receptacle, a regulator controlling the air inlet to said box and operable independently of the gas supply, and an indicator carried by said regulator and provided with graduations corresponding in appearance and numbering to the graduations of said pressure gauge, whereby said regulator may be caused to admit a proper amount of air, in proportion to the flow of gas, by setting the said indicator at the same reading as that of the said pressure gauge, substantially as described.

7. In a gas burner, the combination of a suitable box or casing, a gas receptacle, a supply pipe connected to said receptacle, pipes leading from said receptacle into said box, a sliding regulator controlling the air inlet to said box and manually operable independently of the gas supply, an indicator secured to said regulator, an indicator guide through which said indicator passes, and a pressure gauge for indicating the pressure in said receptacle, the said indicator and the said pressure gauge being graduated with similar markings, whereby the said regulator may be caused to admit a proper amount of air, in proportion to the flow of gas, by setting the said indicator at the same reading as that of the said pressure gauge, substantially as described.

8. A gas burner installation comprising, in combination, a mixing plate or burner brick containing a plurality of gas mixing holes, a gas distributing receptacle, ducts leading from said receptacle to said holes, a slidable damper for regulating the supply of air to said gas mixing holes, a gas pressure gauge between the main gas supply valve and said gas distributing receptacle, and means for indicating the proper position of said damper for various gas pressures existing in said gas distributing receptacle, substantially as described.

9. In a gas combustion unit, the combination of a mixing plate or burner brick containing a plurality of gas mixing holes, a gas distributing receptacle, ducts leading from said receptacle to said holes, a casing surrounding the said ducts and connecting the said gas mixing receptacle and the said mixing plate or burner brick, a slidable chamber adapted to regulate the admission of air to said casing, a gas pressure gauge between the main gas supply valve and said gas distributing receptacle, and means for indicating the proper position of said damper for various gas pressures existing in said gas distributing receptacle, substantially as described.

10. In the method of firing furnaces, the steps consisting in separately measuring the combustion ingredient and the combustion-supporting ingredient passing to the furnace, and varying the amount of one of said ingredients as found necessary by the amount of the other ingredients being supplied, to thereby maintain a predetermined combustion mixture.

11. In the method of firing furnaces, the steps consisting in maintaining a predetermined combustible mixture by measuring the fuel passing to the furnace and measuring the air passing to the furnace.

12. In a fuel burner, an orifice for the fuel, means for supplying fuel to said orifice, means for measuring air and delivering measured amounts of air to the fuel issuing from said orifice, and means for varying either said fuel or air to maintain a predetermined combustion mixture.

In testimony whereof, I have hereunto set my hand.

JAMES CLARENCE HOBBS.